US009894123B2

(12) United States Patent
Miao et al.

(10) Patent No.: US 9,894,123 B2
(45) Date of Patent: Feb. 13, 2018

(54) METHOD OF SHARING CONTROL RIGHT ADAPTED TO INTERACTIVE WHITEBOARD SYSTEM AND HOST DEVICE THEREOF

(71) Applicant: Wistron Corporation, New Taipei (TW)

(72) Inventors: Pen-Tai Miao, New Taipei (TW); Ping-Hung Chen, New Taipei (TW); Fang-Wen Liao, New Taipei (TW)

(73) Assignee: Wistron Corporation, New Taipei (TW)

( * ) Notice: Subject to any disclaimer, the term of this patent is extended or adjusted under 35 U.S.C. 154(b) by 237 days.

(21) Appl. No.: 14/667,705

(22) Filed: Mar. 25, 2015

(65) Prior Publication Data

US 2016/0173545 A1   Jun. 16, 2016

(30) Foreign Application Priority Data

Dec. 16, 2014  (TW) .............................. 103143844 A

(51) Int. Cl.
*H04L 29/06* (2006.01)
*H04L 12/26* (2006.01)

(52) U.S. Cl.
CPC .......... *H04L 65/4076* (2013.01); *H04L 43/16* (2013.01)

(58) Field of Classification Search
CPC .......................... H04L 65/4076; H04L 43/16
See application file for complete search history.

(56) References Cited

U.S. PATENT DOCUMENTS

| 6,175,853 B1 * | 1/2001 | Stracke, Jr. ............... G06F 9/52 718/100 |
| 6,624,827 B1 | 9/2003 | Hwang et al. |
| 2003/0144003 A1 * | 7/2003 | Ranta .................... H04W 48/08 455/450 |

(Continued)

FOREIGN PATENT DOCUMENTS

| CN | 102651754 B | * | 4/2015 | ............. H04L 29/08 |
| EP | 2355563 A1 | * | 10/2011 | ............. H04W 8/00 |
| TW | 268071 B1 | * | 12/2006 | ............. H04L 29/02 |

OTHER PUBLICATIONS

"Office Action of Taiwan Counterpart Application" with partial English translation, dated Jan. 19, 2016, p. 1-p. 6.

*Primary Examiner* — Brian J Gillis
*Assistant Examiner* — Amy Ling
(74) *Attorney, Agent, or Firm* — JCIPRNET

(57) ABSTRACT

A method for sharing a control right and a host device are provided. The method of sharing the control right is adapted to the host device of an interactive whiteboard system. The method includes the following steps. A scanning process is executed to receive an online notification signal broadcast by a first client device, wherein the online notification signal includes a weight value and device information of the first client device; it is determined whether the control right of the interactive whiteboard system is released or not, and when the control right of the interactive whiteboard system is not released, it is determined whether to share the control right of the interactive whiteboard system to the first client device according to the weight value. When the control right is determined to be shared to the first client device, a control right notification signal is transmitted to the first client device.

16 Claims, 4 Drawing Sheets

(56) References Cited

U.S. PATENT DOCUMENTS

| | | | |
|---|---|---|---|
| 2011/0280387 A1* | 11/2011 | Soo | H04M 3/56 379/202.01 |
| 2012/0311119 A1 | 12/2012 | Chen et al. | |
| 2013/0169742 A1* | 7/2013 | Wu | H04N 7/152 348/14.08 |
| 2014/0149880 A1* | 5/2014 | Farouki | H04L 12/1822 715/748 |
| 2015/0179186 A1* | 6/2015 | Swierk | G06F 3/167 704/276 |

* cited by examiner

METHOD OF SHARING CONTROL RIGHT ADAPTED TO INTERACTIVE WHITEBOARD SYSTEM AND HOST DEVICE THEREOF

CROSS-REFERENCE TO RELATED APPLICATION

This application claims the priority benefit of Taiwan application Ser. No. 103143844, filed on Dec. 16, 2014. The entirety of the above-mentioned patent application is hereby incorporated by reference herein and made a part of this specification.

BACKGROUND

Technical Field

The invention relates to a method for sharing a control right and a host device thereof, and particularly relates to a method for sharing a control right adapted to an interactive whiteboard system and a host device thereof.

Related Art

Along with development of electronic technology and network communication technology, today's interactive whiteboard systems have gradually replaced conventional writing boards, and are widely applied in special occasions such as classes, meeting rooms, etc. The whiteboard generally has a touch writing function, and a user can use a writing tool such as a stylus to write or draw on the whiteboard. Further, the interactive whiteboard system is generally integrated with a screen sharing function, such that image data of the whiteboard can be shared to display screens of a plurality of electronic devices in the system, or image data of the electronic devices can be collected and displayed on a specific screen.

Regarding the aforementioned interactive whiteboard system, it is very important to manage the electronic devices connected to the system. U.S. Patent No. 20120311119 discloses a remote managing method and a remote managing system, where a plurality of user devices are connected to a host and execute specific application programs on the host, and meanwhile a manager device is connected to the host for managing the user devices connected to the host. Combined with the aforementioned prior art, the interactive whiteboard system can control and manage a plurality of the user devices.

However, in the conventional interactive whiteboard system, a control right of each of the devices is generally grasped by a server device or a host device. Now, if the user of the user device wants to sends an instruction to the interactive whiteboard system, the user is generally required to move to the server device or the host device, which is inconvenient in usage.

SUMMARY

The invention is directed to a method for sharing a control right, by which the control right of an interactive whiteboard system is shared to client devices in a system, so as to avoid usage inconvenience that a user has to move from the client device to a host device in order to control the interactive whiteboard system.

An embodiment of the invention provides a method for sharing a control right, which is adapted to a host device of an interactive whiteboard system. The method for sharing a control right includes following steps. A scanning process is executed to receive an online notification signal broadcasted by a first client device, where the online notification signal includes a weight value and device information of the first client device. It is determined whether the control right of the interactive whiteboard system is released. When the control right of the interactive whiteboard system is not released, it is determined whether to share the control right of the interactive whiteboard system to the first client device according to the weight value of the first client device. When the control right is determined to be shared to the first client device, a control right notification signal is transmitted to the first client device.

An embodiment of the invention provides a host device, which is adapted to an interactive whiteboard system. The host device includes a communication unit and a processing unit. The communication unit is configured to execute a scanning process to receive an online notification signal broadcasted by a first client device, where the online notification signal includes a weight value and device information of the first client device. The processing unit determines whether a control right of the interactive whiteboard system is released. When the control right of the interactive whiteboard system is not released, the processing unit determines whether to share the control right of the interactive whiteboard system to the first client device according to the weight value of the first client device. When the processing unit determines to share the control right to the first client device, the processing unit transmits a control right notification signal to the first client device through the communication unit.

According to the above descriptions, in the method for sharing the control right and the host device of the invention, in response to the online notification of the client device, an evaluation is correspondingly perform, and the competent client device obtains the control right of the interactive whiteboard system from the host device, and a user of the client device can perform control operations through the client device without moving to the host device. In this way, a time required for the user moving between the host device and the client device is saved, and the interactive whiteboard system can be controlled and managed in a more efficient way.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
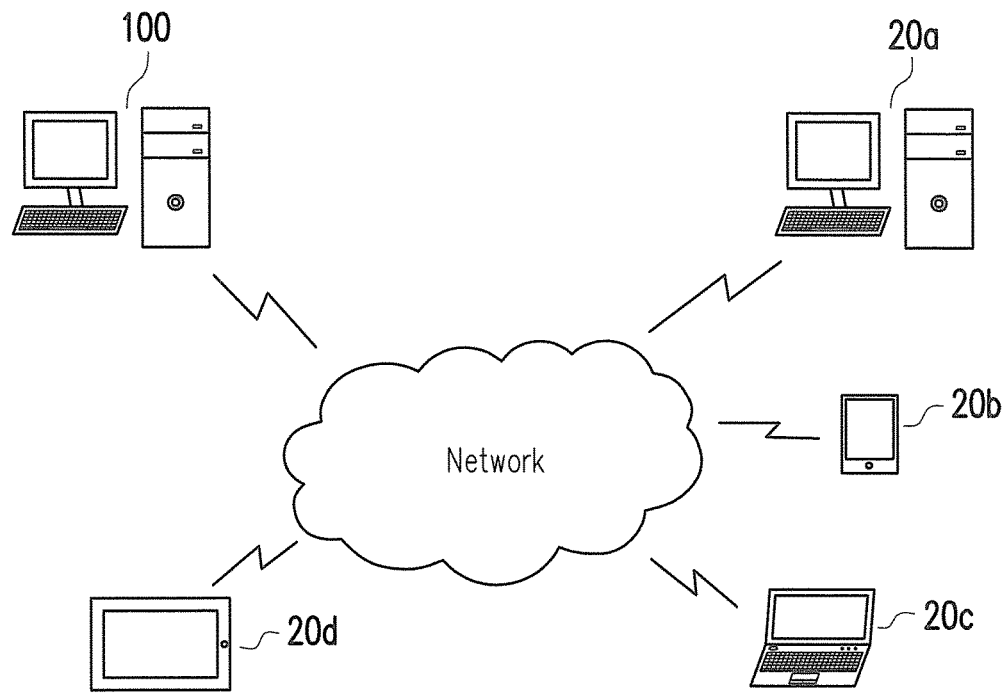
FIG. 1 is a schematic diagram of an interactive whiteboard system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of an interactive whiteboard system according to an embodiment of the invention. Referring to FIG. 1, in an embodiment of the invention, the interactive whiteboard system 10 is composed of a plurality of electronic devices, and one of the electronic devices can be selected as a host device 100. The host device 100 executes a host application program of the interactive whiteboard system 10, and the other electronic devices are client devices 20a-20d, and the client devices 20a-20d execute a client application program of the interactive whiteboard system 10. The host device 100 and the client device 20a-20d are, for example, respectively a desktop computer, a notebook, a tablet PC, a mobile phone, etc., though the invention is not limited thereto. In the present embodiment, the host device 100 serves as a sink, and can be directly or indirectly connected to each of the client devices 20a-20d through a network.

Generally, the host device 100 has a control right of the interactive whiteboard system 10. The host device 100 provides a manager user interface (manager UI), and a user of the host device 100 can control or manage the client devices 20a-20d through the manager UI. For example, regarding the interactive whiteboard system 10 having a screen sharing function, the user of the host device 100 uses the manager UI to designate a client device from which shared screen data is provided. In the embodiment of the invention, the control right of the interactive whiteboard system 10 can be further shared to the client devices 20a-20d. A detail flow of the method for sharing the control right is described later.

Figure 2:
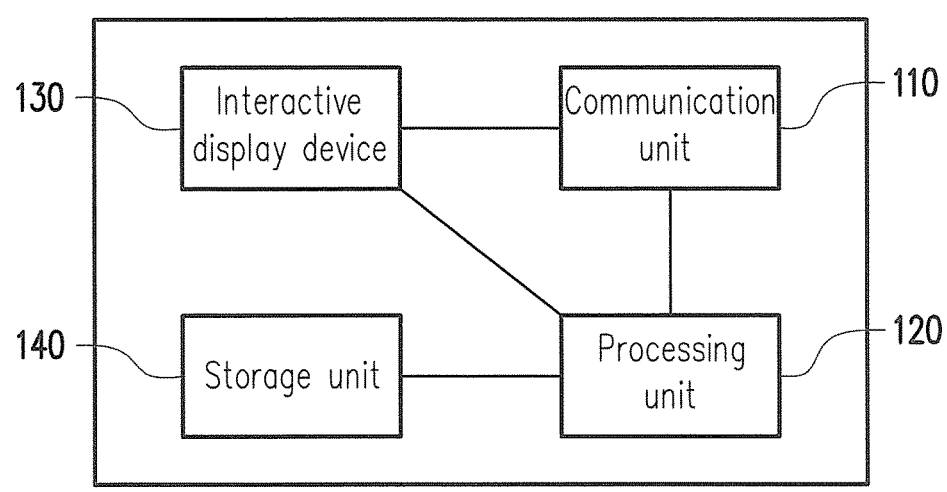
FIG. 2 is a block diagram of a host device according to an embodiment of the invention.

FIG. 2 is a block diagram of a host device according to an embodiment of the invention. Referring to FIG. 2, the electronic device serving as the host device 100 includes a communication unit 110, a processing unit 120, an interactive display device 130 and a storage unit 140. The communication unit 110 is, for example, a wireless communication module supporting various wireless communication standards such as bluetooth, wireless fidelity (WiFi), worldwide interoperability for microwave access (WiMax), near field communication (NFC), long term evolution (LTE), etc. In other embodiments, the communication unit 110 further includes a wired communication module connected through asymmetric digital subscriber line (ADSL), cable modem, etc. The host device 100 can communicate with and exchange data with the other client devices 20a-20d through the communication unit 110.

The processing unit 120 is coupled to the communication unit 110, and is, for example, a central processing unit (CPU), a programmable microprocessor for general purpose or special purpose, a digital signal processor (DSP), a programmable controller or a similar device or a combination of the above devices. The processing unit 120 is used for executing programs or software to provide different functions.

In an embodiment of the invention, the interactive display device 130 is coupled to the communication unit 110 and the processing unit 120, and is, for example, a touch display device combined with a touch function and a display function, though the invention is not limited thereto. In detail, the touch display device can be composed of a display panel such as a liquid crystal display (LCD), a light-emitting diode (LED) display, etc. and a resistive, a capacitive or an optical touch panel. In the present embodiment, the host device 100 displays a graphical manager UI through the interactive display device 130, so as to facilitate the user of the host device 100 to control the interactive whiteboard system 10 and manage all of the client devices 20a-20d in the interactive whiteboard system 10. In other embodiments, the interactive display device 130 can also be a pure display device, and the user can control the interactive whiteboard system 10 and manage the client devices 20a-20d through other input devices such as a keyboard, a mouse, etc.

The storage unit 140 is coupled to the processing unit 120, and the storage unit 140 can be any type of a hard disk drive (HDD), or a random access memory (RAM), a read-only memory (ROM), a flash memory or a similar device or a combination thereof.

Figure 3:
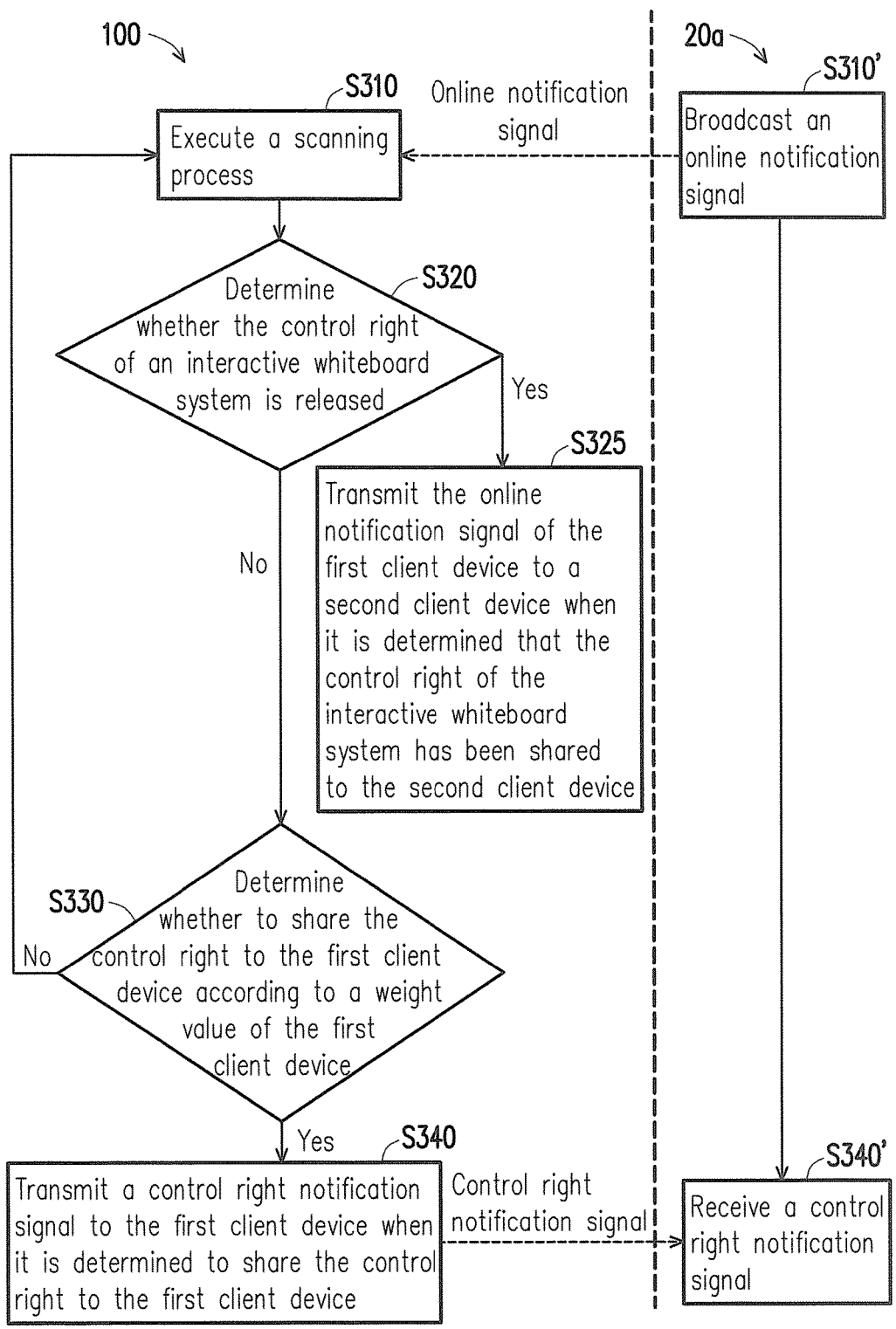
FIG. 3 is a flowchart illustrating a method for sharing a control right according to an embodiment of the invention.

FIG. 3 is a flowchart illustrating a method for sharing a control right according to an embodiment of the invention. Referring to FIG. 3, the method of the present embodiment is adapted to the interactive whiteboard system 10 and the host device 100 of FIG. 1 and FIG. 2. First, the communication unit 110 executes a scanning process (step S310) to receive an online notification signal broadcasted by, for example, a first client device (i.e. the client device 20a of FIG. 1). In detail, after the client device 20a activates the client application program of the interactive whiteboard system 10, the client device 20a broadcast the online notification signal (step S310'), where the online notification signal includes device information and a weight value of the client device 20a. The host device 100 executes the scanning process to receive the online notification signal broadcasted by the client device 20a, and establishes a connection with the client device 20a according to the online notification signal. In the present embodiment, the device information of the client device 20a includes a device name, a network address (i.e., an Internet protocol (IP) address), a media access control (MAC) address, etc. The host device 100 further stores the device information of the client device 20a to the storage unit 140.

After the host device 100 receives the online notification signal of the client device 20a and establishes the connection therewith, the processing unit 120 further determines whether the control right of the interactive whiteboard system 10 is released (step S320). In other words, the processing unit 120 determines whether other client devices have obtained the control right of the interactive whiteboard system 10, so as to avoid a situation that a plurality of the client devices control the interactive whiteboard system 10 to cause a system error. If the processing unit 120 determines that the control right of the interactive whiteboard system 10 has been shared to a second client device (for example, the client device 20b in FIG. 1), the online notification signal of the client device 20a is transmitted to the client device 20b (step S325) to notify the client device 20b. Conversely, if the control right of the interactive whiteboard system 10 is not released, the processing unit 120 determines whether to share the control right to the client device 20a according to the weight value of the client device 20a (step S330).

Regarding all of the client devices 20a-20d in the interactive whiteboard system 10, not all of the users of the client devices 20a-20d have the willingness to execute the control operation, and not all of hardware conditions of the client devices 20a-20d are suitable for performing the control operation. Therefore, in the present embodiment, the online notification signal broadcasted by the client device 20a includes the weight value, and the weight value is provided to the host device 100 to determine whether the client device 20a is suitable for or has the willingness to perform the control operation.

In an embodiment of the invention, the weight value is obtained based on a preference setting, a network quality of service (Qos) score and a processing unit usage rate score of the client device 20a. The preference setting is set by the user of the client device 20a or is set after auto evaluation of the client device 20a. The preference setting is, for example, to use values 0, 0.5, 1 to respectively represent willingness strengths for obtaining the control right. The network QoS score is obtained by performing a network QoS test to the connection by the client device 20a, and converting a test result thereof according to score levels from 1 to 100. The processing unit usage rate score is, for example, obtained by subtracting a value of a usage rate of the processing unit 120 from a value 100. For example, the usage rate of the processing unit 120 is 30%, the processing unit usage rate score is then 70. Since the lower the usage rate of the processing unit is, the more remained execution power the processing unit has, and it is expected that it has higher score value. In the present embodiment, the weight value can be obtained according to a following equation:

$$\text{Weight value}=(\text{processing unit usage rate score}+\text{network QoS score})*\text{preference setting} \quad (1)$$

After the weight value is obtained according to the equation (1), the processing unit 120 determines whether the weight value of the client device 20a is greater than a threshold, so as to determine whether to share the control right to the client device 20a. The threshold can be adjusted to, for example, 50 according to a usage requirement of the interactive whiteboard system 10. After comparison, if the weight value of the client device 20a is greater than the threshold, the processing unit 120 shares the control right to the client device 20a. Conversely, if the weight value of the client device 20a is smaller than or equal to the threshold, the processing unit 120 re-execute the scanning process (step S310). It should be noticed that based on particularity of the preference setting, if the user of the client device 20a does not want to accept the control right and sets the preference setting to 0, the host device 100 absolutely does not share the control right to the client device 20a.

Referring to FIGS. 1-3, when the processing unit 120 of the host device 100 determines to share the control right to the client device 20a, the processing unit 120 transmits a control right notification signal to the client device 20a through the communication unit 110 (step S340), and the client device 20a receives the control right notification signal (step S340'). After the client device 20a receives the control right notification signal, the client device 20a can perform the control operation to the interactive whiteboard system 10.

Figure 4:
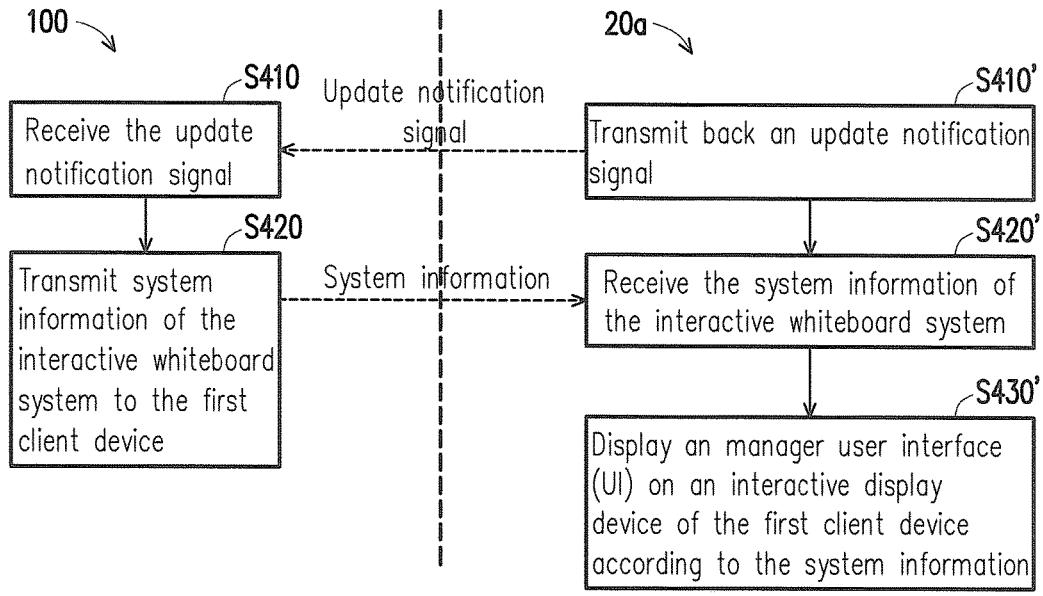
FIG. 4 is a flowchart illustrating a method for displaying a manger UI according to an embodiment of the invention.

In an embodiment of the invention, regarding the client device that has obtained the control right (for example, the client device 20a of the above embodiment), the host device 100 further assists it to draw and display a manager UI to facilitate the user of the client device 20a to perform the control operation. FIG. 4 is a flowchart illustrating a method for displaying the manger UI according to an embodiment of the invention. Referring to FIG. 1, FIG. 2 and FIG. 4, after the client device 20a receives the control right notification signal, the client device 20a transmits back an update notification signal to the host device 100 (step S410'). After the host device 100 receives the update notification signal (step S410), the processing unit 120 transmits system information of the interactive whiteboard system 10 to the client device 20a through the communication unit 110 (step S420). The client device 20a receives the system information (step S420'), and displays the manager UI on an interactive display device of the client device 20a according to the system information (S430'). It should be noticed that in an embodiment of the invention, the manager UI displayed on the interactive display device of the client device 20a can be the same to the manager UI displayed on the interactive display device 130 of the host device 100.

Figure 5:
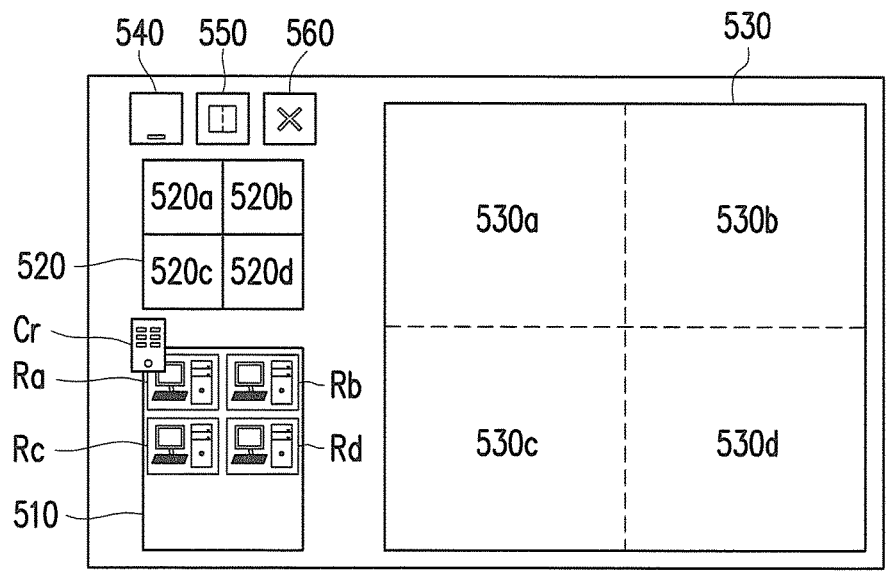
FIG. 5 is a schematic diagram of a manager UI according to an embodiment of the invention.

FIG. 5 is a schematic diagram of a manager UI according to an embodiment of the invention. Referring to FIG. 5, in the present embodiment, the manager UI 500 includes a connected device display region 510, an image layout region 520, an image display region 530, a minimize option 540, a layout switch option 550, an offline option 560 and a control right label Cr. The connected device display region 510 displays a plurality of icons Ra-Rd, and each of the icons Ra-Rd corresponds to one of the client devices 20a-20d connected to the host device 100, i.e. the client devices 20a-20d jointed to the interactive whiteboard system 10. Moreover, regarding the client device (for example, the client device 20a) having the control right, the control right label Cr is attached to the corresponding icon Ra.

Figure 6:
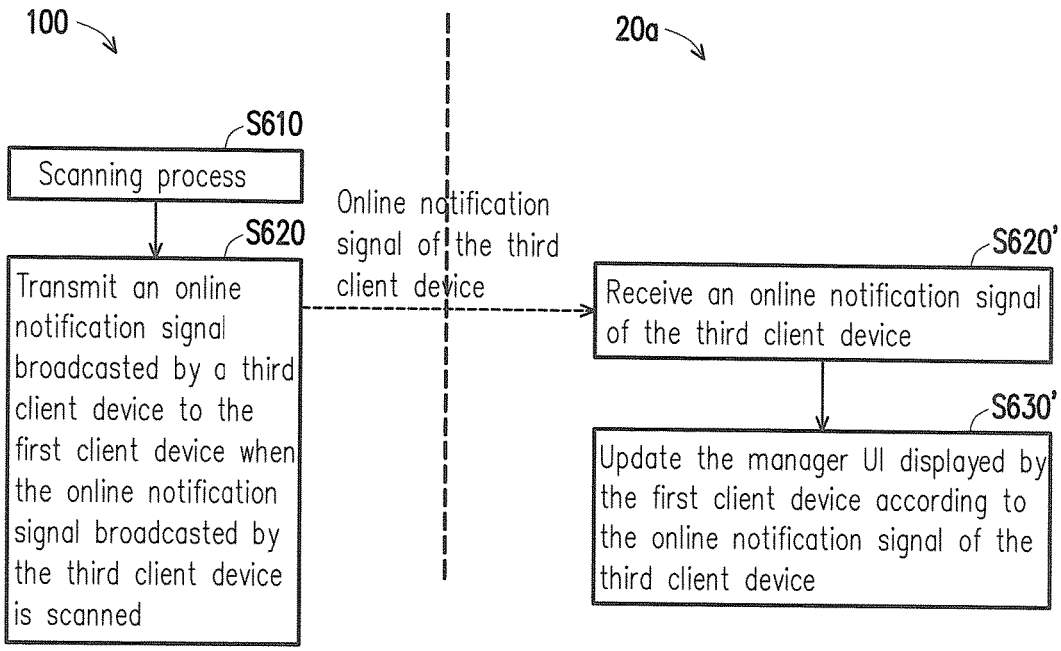
FIG. 6 is a flowchart illustrating a method for updating the manager UI according to an embodiment of the invention.

FIG. 6 is a flowchart illustrating a method for updating the manager UI according to an embodiment of the invention. Referring to FIG. 6, after the manager UI 500 is created, when the communication unit 110 of the host device 100 executes the scanning process (step S610), and scans a third client device (not shown) intended to join the interactive whiteboard system 10, the communication unit 110 transmits an online notification signal broadcasted by the third client device to the client device 20a having the manager UI (step S620). The client device 20a receives the online notification signal of the third client device (step S620'), and updates the manager UI 600 displayed by the client device 20a according to the online notification signal of the third client device (step S630'), for example, to add an icon corresponding to the third client device to the connected device display region 510.

The user can perform a plurality of control operations through the manager UI 500. For example, the manager UI 500 can be used to perform a screen sharing operation. Referring to FIG. 5, the user of the manager UI 500 can drag the icons Ra-Rd to the image layout region 520, and the image display region 530 displays image data corresponding to the client devices 20a-20d through a part of or all of the display region. In the present embodiment, the image layout region 520 has four image blocks 520a-520d, and the image blocks 520a-520d respectively correspond to four display blocks 530a-530d of the image display region 530. For example, when the user drags the icon Rb to the image block 520a, the image display region 530 displays the image data of the client device 20b through the display block 530a.

It should be noticed that in another embodiment of the invention, the image layout region 520 may also have a left image block and a right image block (not shown), and the left image block and the right image block respectively corresponding to left half blocks (the display blocks 530a and 530c) and right half blocks (the display blocks 530b and 530d) of the image display region 530. In another embodiment of the invention, the manager UI 500 further provides a layout switching option 550, and the user can click the layout switching option 550 to perform a display mode switching operation, so as to switch the image layout region 520 having the four image blocks 520a-520d to the image layer region having the left image block and the right image block (not shown), or switch the image layer region having the left image block and the right image block (not shown) to the image layout region 520 having the four image blocks 520a-520d.

The user of the manager UI 500 can respectively perform a minimize operation and an offline operation by clicking the minimize option 540 and the offline option 560. When the minimize operation is performed, the client device 20a minimizes the manager UI 500 and generates a corresponding indication icon in the display image of the client device 20a. When the offline operation is performed, the client device 20a leaves the interactive whiteboard system 10 and hands over the control right.

Figure 7:
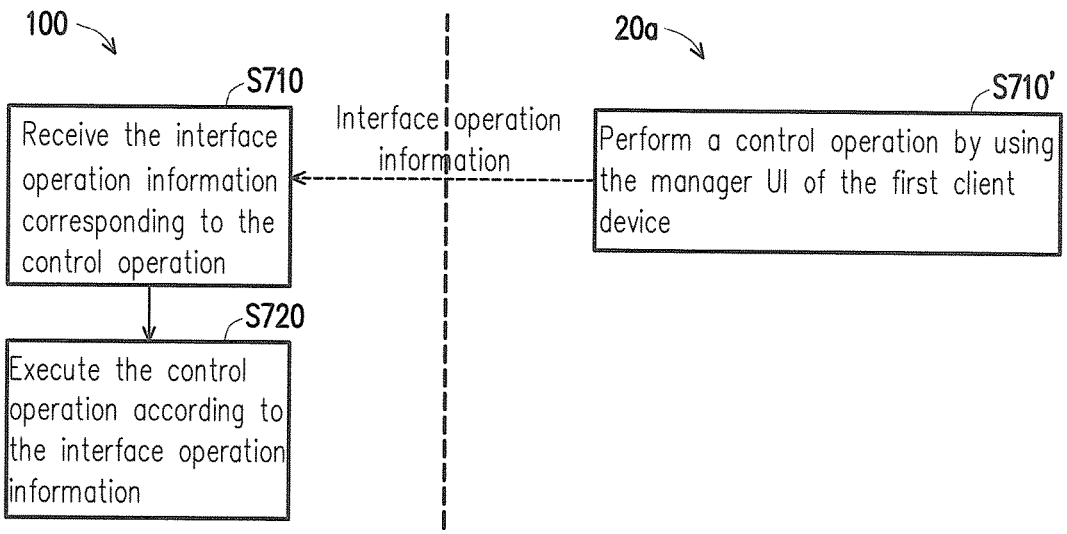
FIG. 7 is a flowchart illustrating a method for executing a control operation according to an embodiment of the invention.

FIG. 7 is a flowchart illustrating a method for executing a control operation according to an embodiment of the invention. Referring to FIG. 7, when the user performs a control operation by using the manager UI 500 of the client device 20a (step S710'), the processing unit 120 of the host device 100 receives interface operation information corresponding to the control operation through the communication unit 110 (step S710). In other words, when the user performs the control operation (for example, an image sharing operation, a display mode switching operation, a minimize operation, an offline operation, etc.) through the manager UI 500 of the client device 20a, the operation or change on the manager UI 500 is taken as the interface operation information and transmitted to the host device 100. Now, the processing unit 120 of the host device 100 executes the control operation according to the interface operation information (step S720). It should be noticed that the client device 20a only transmits an operation result or a change result to the host device 100. For example, when the user executes the image sharing operation, and drags the icon Rb on the manager UI 500 of the client device 20a to the image block 520a of the image layout region 520, the client device 20a does not transmit the whole dragging process to the host device 100, but takes a result of "dragging the icon Rb to the image block 520a" as the interface operation information and transmits the same to the host device 100.

Referring back to FIG. 5, the user of the client device 100 can also perform a control right transfer operation by moving the control right label Cr. For example, the user can drag the control right label Cr attached to the icon Ra to the icon Rd. Now, the host device 100 retrieves the control right form the client device 20a, and shares the control right to a fourth client device (i.e. the client device 20d). In detail, when the host device 100 determines that the user of the client device 20a performs the control right transfer operation according to the received interface operation information, the processing unit 120 of the host device 100 transmits a control right cancellation signal to the client device 20a through the communication unit 110, and transmits a control right notification signal to the client device 20d specified by the control right transfer operation. Therefore, the control right can be transferred between the client devices 20a-20d, and the user of each of the client devices 20a-20d who wants to operate the interactive whiteboard system 10 can directly control the whole interactive whiteboard system 10 without moving.

In summary, in the method for sharing the control right and the host device of the invention, in response to the online notification of the client device, an evaluation is correspondingly perform, and the competent client device obtains the control right of the interactive whiteboard system from the host device, and obtains a same manager UI to control the interactive whiteboard system. Moreover, the control right can be transferred between the client devices, such that the user of each of the client device can obtain the control right of the interactive whiteboard system at a proper timing. In this way, a time required for the user moving between the host device and the client device is saved, and the interactive whiteboard system can be controlled and managed in a more efficient way.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for sharing a control right, adapted to a host device of an interactive whiteboard system, the method for sharing the control right comprising:
   executing a scanning process to receive an online notification signal broadcasted by a first client device, wherein the online notification signal comprises a weight value and device information of the first client device, wherein the weight value is obtained based on a preference setting of the first client device;
   determining whether a control right of the interactive whiteboard system is released;
   transmitting the online notification signal of the first client device to a second client device when the control right is released and the control right is shared to the second client device;
   determining whether to share the control right to the first client device according to the weight value of the first client device when the control right is not released; and
   transmitting a control right notification signal to the first client device when the control right is determined to be shared to the first client device.

2. The method for sharing the control right as claimed in claim 1, wherein the step of determining whether to share the control right to the first client device according to the weight value comprises:
   determining whether the weight value of the first client device is greater than a threshold;
   sharing the control right to the first client device when the weight value of the first client device is greater than the threshold; and
   re-executing the scanning process when the weight value of the first client device is smaller than or equal to the threshold.

3. The method for sharing the control right as claimed in claim 1, wherein the weight value is obtained based on a network quality of service score, and a processing unit usage rate score of the first client device.

4. The method for sharing the control right as claimed in claim 1, wherein after the first client device receives the control right notification signal and transmits back an update notification signal to the host device, the method for sharing the control right further comprises:
   transmitting system information of the interactive whiteboard system to the first client device, wherein the first client device displays a manager user interface on an interactive display device of the first client device according to the system information.

5. The method for sharing the control right as claimed in claim 4, wherein the manager user interface displayed by the first client device is the same to a manager user interface displayed on an interactive display device of the host device.

6. The method for sharing the control right as claimed in claim 4, further comprising:
transmitting an online notification signal of a third client device to the first client device when the online notification signal broadcasted by the third client device is scanned, wherein the first client device updates the manager user interface displayed by the first client device according to the online notification signal of the third client device.

7. The method for sharing the control right as claimed in claim 4, further comprising:
receiving interface operation information corresponding to a control operation when a user performs the control operation by using the manager user interface of the first client device; and
executing the control operation according to the interface operation information.

8. The method for sharing the control right as claimed in claim 7, wherein when the control operation is a control right transfer operation, the step of executing the control operation according to the interface operation information comprises:
transmitting a control right cancellation signal to the first client device; and
transmitting the control right notification signal to a fourth client device specified by the control right transfer operation.

9. A host device, adapted to an interactive whiteboard system, the host device comprising:
a communication unit, executing a scanning process to receive an online notification signal broadcasted by a first client device, wherein the online notification signal comprises a weight value and device information of the first client device, wherein the weight value is obtained based on a preference setting of the first client device; and
a processing unit, coupled to the communication unit, and determining whether a control right of the interactive whiteboard system is released,
wherein when the control right of the interactive whiteboard is released and the control right is shared to a second client device, the processing unit transmits the online notification signal of the first client device to the second client device through the communication unit,
wherein when the control right of the interactive whiteboard system is not released, the processing unit determines whether to share the control right to the first client device according to the weight value of the first client device, and when the processing unit determines to share the control right to the first client device, the processing unit transmits a control right notification signal to the first client device through the communication unit.

10. The host device as claimed in claim 9, wherein the processing unit determines whether the weight value of the first client device is greater than a threshold, and when the weight value of the first client device is greater than the threshold, the processing unit shares the control right to the first client device, and when the weight value of the first client device is smaller than or equal to the threshold, the processing unit re-executes the scanning process.

11. The host device as claimed in claim 9, wherein the weight value is obtained based on a network quality of service score, and a processing unit usage rate score and of the first client device.

12. The host device as claimed in claim 9, wherein after the first client device receives the control right notification signal and transmits back an update notification signal to the host device, the processing unit transmits system information of the interactive whiteboard system to the first client device through the communication unit, and the first client device displays a manager user interface on an interactive display device of the first client device according to the system information.

13. The host device as claimed in claim 12, wherein the host device further comprises an interactive display device, and the manager user interface displayed by the first client device is the same to a manager user interface displayed on the interactive display device of the host device.

14. The host device as claimed in claim 12, wherein when the communication unit scans an online notification signal broadcasted by a third client device, the processing unit transmits the online notification signal of the third client device to the first client device, and the first client device updates the manager user interface displayed by the first client device according to the online notification signal of the third client device.

15. The host device as claimed in claim 12, wherein when a user performs a control operation by using the manager user interface of the first client device, the processing unit receives interface operation information corresponding to the control operation through the communication unit, and executes the control operation according to the interface operation information.

16. The host device as claimed in claim 15, wherein when the control operation is a control right transfer operation, the processing unit transmits a control right cancellation signal to the first client device, and transmits the control right notification signal to a fourth client device specified by the control right transfer operation.

* * * * *